United States Patent
Hellwig et al.

(10) Patent No.: US 11,034,844 B2
(45) Date of Patent: Jun. 15, 2021

(54) ABRADABLE DIMENSIONALLY STABLE PREPARATION CONTAINING PLATELET-SHAPED PARTICLES

(71) Applicant: HENKEL AG & CO. KGAA, Duesseldorf (DE)

(72) Inventors: Nils Hellwig, Krefeld (DE); Mathias Schriefers, Moenchengladbach (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/942,861

(22) Filed: Apr. 2, 2018

(65) Prior Publication Data

US 2018/0223109 A1 Aug. 9, 2018

Related U.S. Application Data

(63) Continuation of application No. PCT/EP2016/073873, filed on Oct. 6, 2016.

(30) Foreign Application Priority Data

Oct. 6, 2015 (DE) .......................... 102015219309.8

(51) Int. Cl.
| | |
|---|---|
| *C09D 5/33* | (2006.01) |
| *C09D 5/00* | (2006.01) |
| *C09D 103/08* | (2006.01) |
| *C09J 11/04* | (2006.01) |
| *C09J 11/08* | (2006.01) |
| *C09J 103/08* | (2006.01) |

(52) U.S. Cl.
CPC .............. *C09D 5/004* (2013.01); *C09D 5/00* (2013.01); *C09D 103/08* (2013.01); *C09J 11/04* (2013.01); *C09J 11/08* (2013.01); *C09J 103/08* (2013.01)

(58) Field of Classification Search
CPC .............................. C09D 5/004; C09D 103/08
See application file for complete search history.

(56) References Cited

U.S. PATENT DOCUMENTS

| | | | | |
|---|---|---|---|---|
| 2,472,680 A * | 6/1949 | Pratt | .......................... | C09C 1/62 523/205 |
| 3,692,731 A * | 9/1972 | McAdow | .................. | C08K 7/06 523/204 |
| 4,440,884 A * | 4/1984 | Jannusch | ............... | C09J 103/02 524/26 |
| 5,929,079 A * | 7/1999 | Borcherding | ........ | C07D 487/04 514/261.1 |
| 6,398,861 B1 * | 6/2002 | Knox | ...................... | C09C 1/622 106/403 |
| 6,663,704 B2 * | 12/2003 | Spencer | .................. | C09D 11/17 106/31.64 |
| 6,749,676 B2 * | 6/2004 | Spencer | .................. | C09D 11/16 106/31.64 |
| 6,761,762 B1 * | 7/2004 | Greiwe | .................. | C09C 1/0015 106/403 |
| 7,449,287 B1 * | 11/2008 | Dontula | .................. | B41M 5/426 430/536 |
| 8,728,227 B2 | 5/2014 | Schumacher et al. | | |
| 8,728,228 B2 | 5/2014 | Schumacher et al. | | |
| 9,107,834 B2 * | 8/2015 | Kitamura | .................. | A61K 8/19 |
| 2003/0114562 A1 * | 6/2003 | Sitabkhan | ............. | C03C 17/006 524/261 |
| 2004/0087668 A1 * | 5/2004 | Schmucker-Castner | ..................... | A61K 8/4933 516/90 |
| 2005/0142084 A1 * | 6/2005 | Ganguly | ................... | A61K 8/26 424/63 |
| 2007/0107635 A1 * | 5/2007 | Soane | .................. | A61K 8/0241 106/493 |
| 2007/0266901 A1 * | 11/2007 | Rance | ....................... | C08L 3/02 106/501.1 |
| 2010/0047200 A1 * | 2/2010 | Luukas | ................ | A61K 8/0229 424/64 |
| 2011/0300200 A1 * | 12/2011 | Pfaff | ........................ | A61K 8/11 424/401 |

(Continued)

FOREIGN PATENT DOCUMENTS

| | | |
|---|---|---|
| CA | 2826831 A1 | 8/2012 |
| DE | 102009037932 A1 | 2/2011 |

(Continued)

OTHER PUBLICATIONS

Prospector (Timiron Starluster MP-115, https://www.ulprospector.com/en/na/PersonalCare/Detail/613/29424/Timiron-Starluster-MP-115, 2020) (Year: 2020).*

(Continued)

*Primary Examiner* — Liam J Heincer

(74) *Attorney, Agent, or Firm* — James E. Piotrowski

(57) ABSTRACT

The invention relates to a dimensionally stable preparation which can be abraded on flat materials, containing a translucent water-based polymer-containing carrier composition and platelet-shaped solid particles. The platelet-shaped solid particles have an average maximum diameter ranging from 2 to 40 μm and are contained in the preparation in a proportion by volume specified by the selected particle size in order to achieve a sheen which is clearly perceptible to the human eye while simultaneously having good abrasion properties. In a sub-aspect of the invention, the preparations according to the invention further have adhesive properties such that the abraded film is best suited for securing flat decorative elements or generally for adhering flat porous materials.

16 Claims, No Drawings

(56) References Cited

U.S. PATENT DOCUMENTS

2012/0107625 A1* 5/2012 Smith ................ C09D 5/004
                                                      428/447
2012/0276177 A1* 11/2012 Hilliard, Jr. .......... A61K 8/0245
                                                      424/401

FOREIGN PATENT DOCUMENTS

| DE | 102009037935 A1 | 2/2011 |
| WO | 2012110594 A1 | 8/2012 |
| WO | 2015107149 A1 | 7/2015 |

OTHER PUBLICATIONS

International Search Report for International PCT Patent Application No. PCT/EP2016/073873 dated Nov. 14, 2016.

* cited by examiner

ABRADABLE DIMENSIONALLY STABLE PREPARATION CONTAINING PLATELET-SHAPED PARTICLES

The present invention relates to a dimensionally stable preparation which can be rubbed off on flat materials, containing a translucent, water-based carrier composition and flake-shaped solid particles, the flake-shaped solid particles having an average largest particle diameter in the range of from 2 to 40 µm. The flake-shaped solid particles are contained in the preparation in a proportion by volume specified by the selected particle size in order to achieve a glitter effect which is clearly perceptible to the human eye while simultaneously having good rub-off properties. Furthermore, in a sub-aspect of the present invention, preparations according to the invention have adhesive properties such that the rubbed-off film is best suited for securing flat decorative elements or generally for adhesively bonding flat, porous materials.

Consumer articles for giving a colored design to paper, cardboard packaging and nonwoven fabrics are sold on the market in a wide range of different forms of application, e.g. in the form of crayons, brush paints, chalk, stickers and the like. Consumer articles of this kind are generally intended to make it possible to give the mentioned materials a unique design, especially when they are only used in connection with creative activities, such as drawing and making crafts. It has always been known and typical to use pigments as carriers of an optical effect, whether this is color, luster or brightness, in order to successfully give objects that are used on a daily basis or works of art an elevated aesthetic value. Accordingly, there are commercially available markers for giving a colored design that make possible a permanent linear, two-dimensional design such that, in addition to distinguishing the lines and two-dimensional shapes, pigments can also be applied at the same time as the ink. On account of their reflective properties upon exposure to visible light, the pigments applied in the region of the design impart a luster effect that produces rays of reflected light in the region of the design when the relative position of the surface of the paper with respect to the incident light changes. The viewer perceives the plurality of rays of reflected light during a relative movement of this kind as a glitter effect.

In order to achieve a glitter effect of this kind, flake-shaped particulate solids, e.g. as a granulate or powder, are used which are themselves the luster pigment having the corresponding optical properties or at least contain said pigment on or near to the surface of said solids in an insolubilized state.

This is problematic in that the form of application of the particulate solids containing the luster pigment has to have the property whereby, by means of said form of application, the particulate solids can be applied uniformly to the flat substrate. In liquid preparations, a problem often arises in that the particulate solids, which have to be at least 2 µm in size in order to achieve a visible glitter effect, form a sediment and first have to be distributed in the liquid medium in as uniform a manner as possible before said liquid medium is applied. Conversely, for solid preparations it has to be ensured that a uniform, minimally thin film for the preparation containing the particulate solid is rubbed off on the flat substrate.

However, there has not previously been a known form of application of the luster pigments, intended for giving flat materials a visual design, that is able to apply a uniform film containing the particulate solid in a controlled manner in the region of contact with the form of application, which film leaves a glittering appearance when the relative position of the flat substrate with respect to the incident light changes.

Furthermore, it is also desirable for the form of application to also impart the additional property of being able to bond other materials or decorative elements, i.e. having adhesive properties. This would make it possible to achieve a purely aesthetic surface design and a creative, three-dimensional design of the flat materials by means of bonding using the same form of application.

There are a wide range of different known preparations for adhesives that are suitable in particular for flat, porous materials, which preparations, particularly in recent times, have been based on liquid or dimensionally stable adhesive preparations that substantially consist of renewable raw materials, e.g. starch derivatives or sugar, and water and are described in more detail in laid-open applications WO 2012/110594 A1 and WO 2015/107149 A1, for example. Water-based preparations of this kind place particular requirements on the particulate solid containing the pigment as the corrosion of the pigments, i.e. the molecular dispersion thereof in the adhesive preparation, has to be prevented in order to achieve a glitter effect that is intended to be retained even after the adhesive preparation has been stored for a long time.

The object of the present invention is therefore to provide a form of application of a preparation suitable for applying a uniform film containing solid particles to flat substrates, which form of application contains solid particles in an amount and of a size required to produce an optical effect that is imparted by the solid particles and relies on interference and reflection in the visible wavelength range, in a film of the preparation applied to a flat substrate (luster or glitter effect when the relative position changes). At the same time, the film is intended to be applied only in the region of contact with the form of application and to a largely even layer thickness. In a sub-aspect, the film is intended to have adhesive properties that make it possible to bond porous substrates, such as paper, to one another. For this sub-aspect, it is necessary to ensure for water-based adhesive preparations that the optical effect is durable in the preparation and is not lost as a result of corrosion.

The general object of the invention is achieved by a water-based, dimensionally stable preparation consisting of a translucent carrier composition containing builder substances selected from $C_{12}$ to $C_{22}$ fatty acids and/or salts thereof in an amount of overall less than 15 wt. % on the basis of the carrier composition, and of flake-shaped solid particles, the flake-shaped solid particles having an average largest particle diameter in the range of from 2 to 40 µm, and the dimensionless product of the particulate flake-shaped solid component in percentage by volume on the basis of the preparation and the average largest particle diameter in micrometers being between 5 and 20.

Within the meaning of the present invention, a preparation is dimensionally stable if a mass (10 grams) of the preparation shaped as a cylinder having a 2 $cm^2$ base only deforms irreversibly above a pressure of 20 N/$cm^2$ when a steadily increasing force acts perpendicularly to the base of the cylinder at 20° C. and 50% relative humidity. It is possible to monitor the action of the force by means of a force measurement device and to determine whether deformation has occurred by means of the Texture Analyser TA-CT HiR (Stable Micro Systems Ltd.).

Within the meaning of the present invention, a dimensionally stable preparation is water-based if it contains at least 5 wt. % water.

Within the meaning of the present preparation, a carrier composition is understood to mean the component of the preparation that is not a particulate, flake-shaped solid component, the carrier composition being translucent. A carrier composition is translucent if said composition, as a film located between two glass panes having a weight per unit area of at least 1 g/m$^2$, attenuates visible light ($\lambda$=540 nm) by no more than 20% when the path of the rays is vertical to the surface of the glass panes.

A solid component is flake-shaped if it consists of individual particles which, in a cross section orthogonal to the axis of the largest extension thereof through the center of gravity of the particle, has a cross-sectional area that has a ratio of largest lateral extension to smallest lateral extension of at least 4:1. The average largest particle diameter of the flake-shaped solid particles can be determined by analyzing a statistical sample of the preparation according to the invention comprising at least 50 flake-shaped particles by means of individual optical analysis using light-microscopic images.

A preparation according to the invention has excellent compressive strength and at the same time optimum rub-off properties that make it possible to rub off the flake-shaped solid particles on a flat, porous substrate, preferably paper, in a uniform manner and not to occasional excess, e.g. in the form of lumps, such that a uniform glitter effect appears over the entire rub-off area when the solid particles are prepared accordingly. Optimum rub-off also translates to the preparation being pleasing for the user to use; the preparation slides more easily over the surface to which a design is to be given. Furthermore, when rubbed off by hand, a precise amount of carrier composition is rubbed off such that adhesive bonding to other flat, porous substrates, preferably paper, is possible when the carrier composition is prepared using the corresponding materials.

Preferred embodiments of the preparation according to the invention will be described below.

With regard to the flake-shaped solid particles, in order for them to be suitably prepared so as to provide a glitter effect, it is preferred for the solid particles to consist at least in part of a layered inorganic material that preferably has a refractive index that is higher than that of the translucent carrier composition by a factor of at least 1.4. If this physical property is fulfilled, total reflection occurs over a wide angle of incidence in relation to the surface of each particle such that, at given viewing angles, the light that is incident on a rubbed-off film of the preparation is visible as a plurality of rays of reflected light (glitter effect) even when the particles are statistically spatially oriented.

It is also preferred according to the invention for the flake-shaped solid particles to have a layer structure in which the layered inorganic material is bordered by two adjacent plastics layers which are each translucent. This ensures that the layered inorganic material is protected against corrosion as far as possible. In the present case, this is important as the preparation is water-based and as such exerts a solution pressure on the inorganic material, which pressure causes dissociation into ionogenic components and thus corrosion of the layer that brings about the glitter effect.

The layered inorganic material, which gives the flake-shaped particles the property of being perceived to shimmer or, in a composite of a plurality of particles of this kind, to glitter during a change to the relative position, can in principle be selected from a plurality of materials or pigments. The materials that can be used according to the invention are, for example, natural pearlescing pigments, e.g. fish silver (guanine/hypoxanthine mixed crystals from fish scales) or nacre (from ground mussel shells), monocrystalline flake-shaped pearlescing pigments, such as bismuth oxychloride, and pearlescing pigments based on mica and mica/metal oxide, and micas that have been provided with a metal oxide coating.

In a preferred preparation according to the invention, the inorganic material is selected from metallic zinc, copper and/or aluminum, from silicates, and/or from oxides of the elements iron, titanium, zirconium and/or aluminum. It is necessary to protect in particular the metal embodiments against corrosion such that the embodiment of the flake-shaped solid particles in which the metal inorganic material is arranged between plastics layers is particularly preferred.

Preferred silicates that may be contained as flake-shaped solid particles in preparations according to the invention are mica and/or mica coated with metal oxide, e.g. selected from muscovite, phlogopite, paragonite, biotite, lepidolite and margarite. Suitable metal oxides for coating the mica are, inter alia, $TiO_2$, $ZnO$ and $Fe_2O_3$.

In general, the type of the plastics layers does not limit how effective the flake-shaped solid particles containing layered inorganic material are in imparting a luster or glitter effect. However, it is preferred for the plastics material not to tend age as a result of exposure to UV radiation in such a way that the solid particles are gradually discolored or stained. In this respect, according to the invention preparations are preferred in which the plastics layers consist of polyethylene terephthalate, polyethylene, polypropylene or polycarbonate, particularly preferably of polyethylene terephthalate.

In a preferred embodiment of the preparation according to the invention, the flake-shaped solid particles can be obtained by pulverizing a plastics film composite preferably having a thickness of less than 40 μm, particularly preferably less than 20 μm, the composite containing inorganic material between two or more plastics films in a layered manner.

The property of the preparation of being dimensionally stable but still easy to rub off is provided mainly by the presence of builder substances. According to the invention, it is therefore preferred for the translucent carrier composition to contain at least 1 wt. %, particularly preferably at least 2 wt. %, although preferably no more than 10 wt. %, builder substances selected from $C_{12}$ to $C_{22}$ fatty acids and salts thereof, in each case based on the carrier composition. In these preferred amount ranges, the water-based preparation is given structural properties that allow a person skilled in the art to add organic compounds over wide ranges, without the basic properties of being dimensionally stable and capable of rubbing off necessarily being lost.

Within the scope of the present invention, preferred examples of salts of $C_{12}$ to $C_{22}$ fatty acids are selected from sodium, potassium and/or calcium salts.

In order to provide an adhesive preparation having a satisfactory range of performance, it is essential for further organic components to be added; at the same time, the size of the water component has to be such that this addition is even made possible. In the present case, it is therefore firstly preferred for a preparation according to the invention to contain at least 20 wt % water and, in order to achieve properties of bonding flat, porous substrates in a satisfactory manner, to also preferably contain at least 10 wt. % water-soluble or water-dispersible organic polymers, in each case based on the carrier composition. Within the meaning of the present invention, an inorganic polymer is water-soluble or water-dispersible if, at a temperature of 20° C., at least 100 g of the polymer can be uniformly dissolved in 1000 g of deionized water ($\kappa$<1 pScm$^{-1}$) and/or can be dispersed at a particle diameter of at least 200 nm, without sediment forming over a period of 10 hours.

In a preferred embodiment of the preparation according to the invention that is in particular suited to adhesively bonding paper, at least 20 wt. % starch ethers is contained on the basis of the carrier composition, which ethers preferably have, as a 40 wt % aqueous solution at 20° C., a viscosity of less than 200,000 mPas, as measured using a Brookfield viscometer. In this connection, starch ethers are understood to mean at least in part etherified starches. In this connection, starch ethers are particularly preferred which have chemical structural units of condensation products between the hydroxyl groups of the anhydroglucose units of starch molecules and hydroxyl groups of alcohols and carboxylic acids. Preferred examples of these starch derivatives in a preparation according to the invention are hydroxyalkyl starches, carboxymethyl starches or hydroxyalkyl carboxymethyl starches as mixed ethers. It is also preferred for these starch ethers to comprise no more than 10 carbon atoms in the aliphatic ether group as the water solubility of said starch ethers is otherwise considerably reduced such that either the adhesive strength or the translucence of the carrier composition is compromised. Certain types of water-soluble starch ethers are therefore preferably used. These include hydroxyethyl and hydroxypropyl starch, and carboxymethyl starch and hydroxy $C_2$-$C_6$ alkyl carboxymethyl starches, in particular hydroxyethyl carboxymethyl starches, hydroxypropyl carboxymethyl starches and/or hydroxyethyl hydroxypropyl carboxymethyl starches.

In order to achieve good adhesive properties, it is also preferred for the preparation according to the invention to contain at least 10 wt. % of one or more compounds selected from monosaccharides, disaccharides or trisaccharides and/or sugar alcohols, particularly preferably saccharose, in each case based on the carrier composition. The total proportion of monosaccharides, disaccharides or trisaccharides and sugar alcohols is preferably less than 30 wt. % on the basis of the carrier composition in a preparation according to the invention.

In a particularly preferred embodiment, the carrier composition in a preparation according to the invention contains
 a) 3-10 wt. % $C_{12}$ to $C_{22}$ fatty acids and salts thereof;
 b) 20-50 wt. % starch ethers;
 c) 10-30 wt. % saccharose; and
 d) at least 30 wt. % water,
 in each case based on the carrier composition.
The pH of the carrier composition in a preparation according to the invention is determined substantially by the above-mentioned components and is therefore in the alkaline range, preferably at least 9, particularly preferably at least 10, although preferably no more than 12. The pH of the carrier composition in a preparation according to the invention is intended to be determined in a 1 wt. % solution of the carrier composition in deionized water at 20° C.

EMBODIMENTS

Cylindrical, dimensionally stable preparations having a 2 $cm^2$ base and a mass of 10 grams, based on a carrier composition formulation (Table 1) containing varying amounts of glitter particles, were prepared according to Table 2 and assessed with regard to their rub-off properties and the occurrence of a glitter effect in a lit room (1,200 lumen; 3,300 K, distance from the light source to the sample: approx. 2 m) as a film that had been rubbed off on paper having a weight per unit area of g/m². The film was rubbed off over a length of 10 cm at a contact pressure of 5 N/cm² at angle of inclination of 10° in relation to the surface of the paper. The glitter particles consist of a pulverized polyethylene terephthalate film composite which has a varying particle size and in which the layered inorganic material having a high refractive index is inserted.

TABLE 1

Carrier composition formulation

| Compound | Amount/wt. % |
|---|---|
| Fatty acid $C_{14-16}$ | 5.6 |
| Starch ether | 23.9 |
| Saccharose | 20 |
| Water | 47 |

It is clear that good rub-off properties and an easily visible optical glitter effect only occur simultaneously in a very narrow window on the basis of particle size and proportion by volume, and therefore the desired property profile is only achieved for preparations according to the invention.

TABLE 2

Preparations containing flake-shaped glitter particles

| | | | | Glitter effect[2] | |
|---|---|---|---|---|---|
| No. | Size*/μm | Vol. % | Rub-off[1] | in the film | in the marker |
| V1 | 62 | 2 | 1 | 1 | 2 |
| V2 | | 0.7 | 2 | 1 | 1 |
| V3 | 15 | 2 | 3 | 4 | 4 |
| E1 | | 0.7 | 4 | 4 | 4 |
| E2 | 8 | 2 | 5 | 4 | 4 |
| E3 | | 0.7 | 5 | 3 | 4 |
| E4 | 4 | 2 | 5 | 2 | 3 |
| V4 | | 0.7 | 5 | 1 | 1 |

*average largest particle diameter determined for 50 individual particles in a sample of the loose bulk of the glitter flakes (Geotec/Geocrystal C R/R 008 HEX x 001)
[1] 5 uniform film; no lumps
  4 substantially uniform film; no lumps
  3 substantially uniform film; slight lump formation
  2 considerable lump formation
  1 severe lump formation
[2] 4 clearly visible
  3 visible
  2 distinguishable
  1 hardly visible

The invention claimed is:

1. A water-based, dimensionally stable preparation comprising:
 a translucent carrier composition containing builder substances selected from $C_{12}$ to $C_{22}$ fatty acids and/or salts thereof in an amount of less than 15 wt. % on the basis of the carrier composition; and
 a plurality of flake-shaped solid particles,
 wherein the flake-shaped solid particles have an average largest particle diameter in the range of 2 to 40 μm, and
 wherein the carrier composition has a pH of at least 9 to no more than 12 and a dimensionless product of the flake-shaped solid particles measured by multiplying the percentage by volume of the flake-shaped particles in the preparation by the average largest particle diameter in micrometers is between 5 and 20.

2. The preparation according to claim 1, wherein the flake-shaped solid particles consist at least in part of a layered inorganic material having a refractive index that is higher than that of the carrier composition by a factor of at least 1.4.

3. The preparation according to claim 2, wherein the inorganic material is selected from one or more of metallic zinc, metallic copper, metallic aluminum, silicates, iron oxide, titanium oxide, zirconium oxide and aluminum oxide.

4. The preparation according to claim 3, wherein the inorganic material is a silicate selected from the group consisting of mica, mica coated with metal oxide, and any combination thereof, wherein the mica coated with metal oxide is selected from muscovite, phlogopite, paragonite, biotite, lepidolite and margarite, and wherein the coating is $TiO_2$, $ZnO$ or $Fe_2O_3$.

5. The preparation according to claim 2, wherein the flake-shaped solid particles have a layer structure in which the layered inorganic material is bordered by two adjacent plastics layers which are each translucent and each plastic layer independently consists of polyethylene terephthalate, polyethylene, polypropylene or polycarbonate.

6. The preparation according to claim 1, wherein the translucent carrier composition contains at least 1 wt. % builder substances selected from $C_{12}$ to $C_{22}$ fatty acids and salts thereof, on the basis of the carrier composition.

7. The preparation according to claim 1, wherein the translucent carrier composition contains 1 wt. % to 10 wt. % builder substances selected from $C_{12}$ to $C_{22}$ fatty acids and salts thereof, on the basis of the carrier composition.

8. The preparation according to claim 1, wherein the salts of $C_{12}$ to $C_{22}$ fatty acids are selected from sodium, potassium and/or calcium salts.

9. The preparation according to claim 1, wherein the translucent carrier composition contains at least 20 wt. % water on the basis of the carrier composition.

10. The preparation according to claim 1, wherein the carrier composition contains at least 20 wt. % starch ethers on the basis of the carrier composition, said starch ethers having, as a 40 wt. % aqueous solution at 20° C., a viscosity of less than 200,000 mPas.

11. The preparation according to claim 10, wherein the carrier composition contains at least 10 wt. % saccharose on the basis of the carrier composition.

12. The preparation according to claim 1, consisting of the carrier composition and the plurality of flake-shaped solid particles; wherein the carrier composition consists of:
 a) 3-10 wt. % $C_{12}$ to $C_{22}$ fatty acids and salts thereof;
 b) 20-50 wt. % starch ethers;
 c) 10-30 wt. % saccharose; and
 d) at least 30 wt. % water,
 in each case on the basis of the carrier composition.

13. The preparation according to claim 1 being an adhesive.

14. A water-based, dimensionally stable preparation comprising:
 a translucent carrier composition, comprising:
  a) 3-10 wt. % $C_{12}$ to $C_{22}$ fatty acids and/or salts thereof;
  b) 20-50 wt. % starch ethers;
  c) 10-30 wt. % saccharose; and
  d) at least 30 wt. % water,
  in each case on the basis of the carrier composition, and
 a plurality of flake-shaped solid particles,
  wherein the flake-shaped solid particles have an average largest particle diameter in the range of 2 to 40 µm, and wherein a dimensionless product of the flake-shaped solid particles measured by multiplying the percentage by volume of the flake-shaped particles in the preparation by the average largest particle diameter in micrometers is between 5 and 20.

15. A water-based, dimensionally stable preparation comprising:
 a translucent carrier composition containing builder substances selected from $C_{12}$ to $C_{22}$ fatty acids and/or salts thereof in an amount of less than 15 wt. % on the basis of the carrier composition; and
 a plurality of flake-shaped solid particles having a layer structure in which a layered inorganic material is bordered by two adjacent plastics layers which are each translucent, the inorganic material selected from one or more of natural pearlescing pigments, monocrystalline flake-shaped pearlescing pigments, and pearlescing pigments, wherein the flake-shaped solid particles have an average largest particle diameter in the range of 2 to 40 µm, and a dimensionless product of the flake-shaped solid particles measured by multiplying the percentage by volume of the flake-shaped particles in the preparation by the average largest particle diameter in micrometers is between 5 and 20.

16. The preparation according to claim 15, wherein the natural pearlescing pigment is fish silver or nacre, the monocrystalline flake-shaped pearlescing pigment is bismuth oxychloride, and the pearlescing pigment is based on mica and mica/metal oxide, or mica that has been provided with a metal oxide coating.

* * * * *